United States Patent
Afghani et al.

(10) Patent No.: US 10,740,334 B1
(45) Date of Patent: Aug. 11, 2020

(54) MULTITENANT BASED QUERY PLAN

(71) Applicant: Workday, Inc., Pleasanton, CA (US)

(72) Inventors: Amir Ali Afghani, San Ramon, CA (US); Erol Guney, San Ramon, CA (US)

(73) Assignee: Workday, Inc., Pleasanton, CA (US)

(*) Notice: Subject to any disclaimer, the term of this patent is extended or adjusted under 35 U.S.C. 154(b) by 222 days.

(21) Appl. No.: 15/845,037

(22) Filed: Dec. 18, 2017

(51) Int. Cl.
*G06F 16/24* (2019.01)
*G06F 16/2453* (2019.01)
*G06F 16/951* (2019.01)
*G06F 16/2455* (2019.01)

(52) U.S. Cl.
CPC .... *G06F 16/24549* (2019.01); *G06F 16/2455* (2019.01); *G06F 16/951* (2019.01)

(58) Field of Classification Search
CPC .................................................. G06F 16/24549
USPC ................................ 707/713, 718, 719, 720
See application file for complete search history.

(56) References Cited

U.S. PATENT DOCUMENTS

| | | | |
|---|---|---|---|
| 2008/0052266 A1* | 2/2008 | Goldstein | G06F 16/24549 |
| 2010/0250518 A1* | 9/2010 | Bruno | G06F 16/24 707/718 |
| 2014/0188532 A1* | 7/2014 | Liu | G06Q 10/0631 705/7.12 |

* cited by examiner

*Primary Examiner* — Baoquoc N To
(74) *Attorney, Agent, or Firm* — Van Pelt, Yi & James LLP

(57) ABSTRACT

A system for determining a query ordering includes an input interface and a processor. The input interface is configured to receive a set of commingled data. The commingled data comprises data associated with a plurality of tenants. The input interface is configured to receive a query. The processor is configured to determine an efficient ordering for the query. The efficient ordering for the query is based at least in part on the set of commingled data. The processor is configured to prompt a user for a permission to change an execution ordering for the query in response to the efficient ordering for the query being different from a user indicated ordering for the query.

21 Claims, 9 Drawing Sheets

US 10,740,334 B1

MULTITENANT BASED QUERY PLAN

BACKGROUND OF THE INVENTION

On a software as a service platform, tenant data is strictly segregated in order to maintain separation of data belonging to different tenants. Tenant data is stored on a set of data partitions securely separated by tenant (e.g., on different computers, on different hard drives, on different virtual machines, etc.) in order to prevent users from accessing data belonging to other tenants. In some situations, tenants wish to share data for comparison purposes or to get a more complete view of a situation (e.g., salary surveys or other industry benchmarks) and they provide a data set to a third party in exchange for access to the pooled set. The tenants typically wish to perform reporting on the pooled data set—for example, computing statistics, evaluating queries, etc. The pooled data set is typically large and complex, causing query evaluation to be a complex process. This creates a problem where queries can take a long time to evaluate, degrading the user experience of multi-tenant data analysis.

BRIEF DESCRIPTION OF THE DRAWINGS

Various embodiments of the invention are disclosed in the following detailed description and the accompanying drawings.

DETAILED DESCRIPTION

Figure 1:
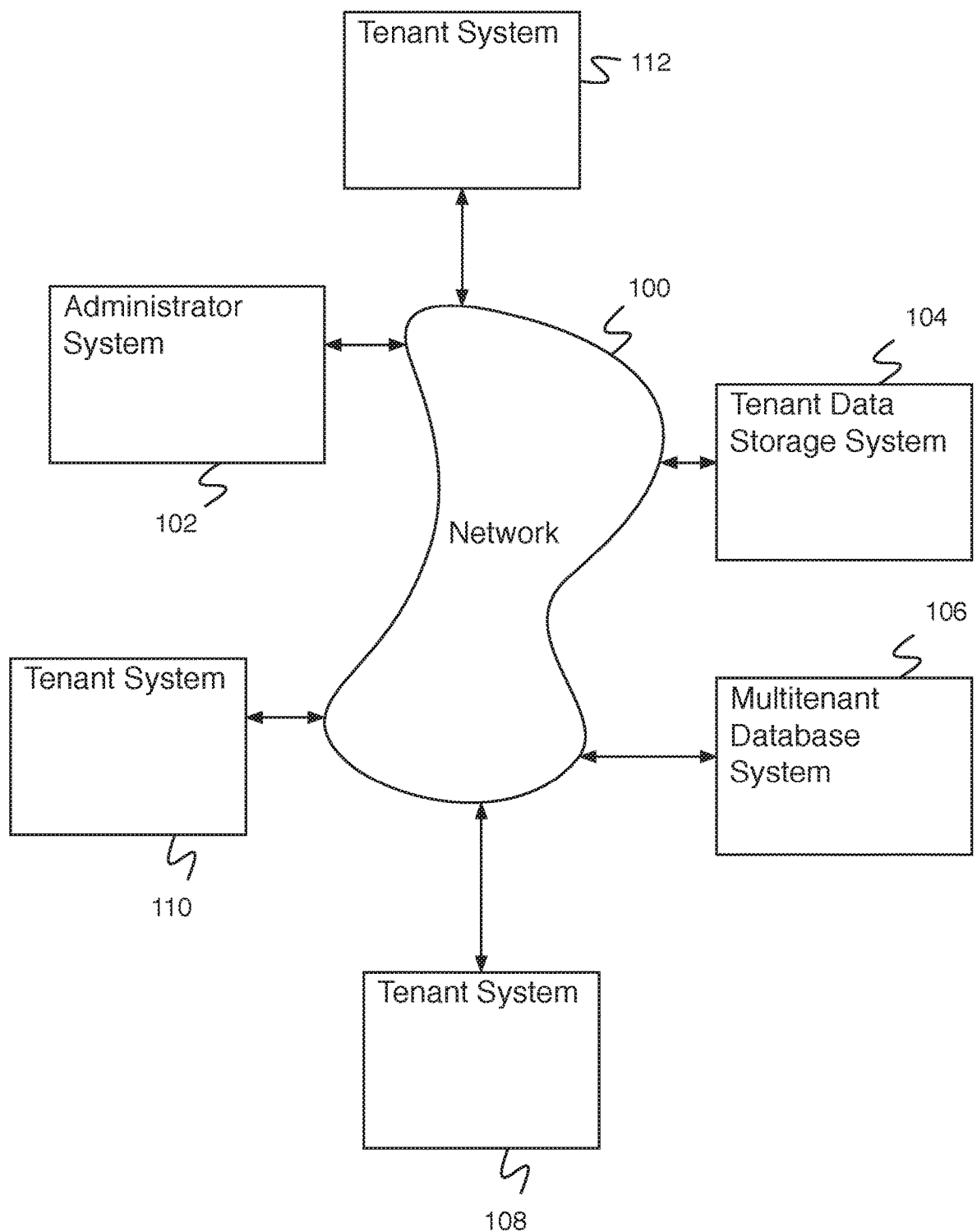
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a query ordering comprises an input interface configured to receive a set of commingled data, wherein the commingled data comprises data associated with a plurality of tenants, and to receive a query. The system for determine a query ordering additionally comprises a processor configured to determine an efficient ordering for the query, wherein the efficient ordering for the query is based at least in part on the set of commingled data, and in the event the efficient ordering for the query is different from a user indicated ordering for the query, prompt a user for a permission to change an execution ordering for the query. The system for determining a query ordering additionally comprises a memory coupled to the processor and configured to provide the processor with instructions.

In some embodiments, the system for determining a query ordering comprises a system for evaluating a query on a database system comprising a set of commingled data. In various embodiments, the query evaluated comprises a query that includes a logical operator (e.g., AND or OR), a query operator that operates on a pair of query elements (e.g., A AND B; B OR A, etc.), a query element that can be determined to be true or false, a query in which each query element comprises a database query that can be determined to be true or false, or any other appropriate query. Example query elements on a human resources system database comprise: user=female?; user=high_performer; user subordinates>=10; user_location=California; etc.

The system for determining a query ordering examines multiple logically equivalent orderings of the query (e.g., A OR B; B OR A) to determine probable different evaluation times for the orderings. Using these different evaluation times, the system can determine a likely optimized evaluation strategy for the logical operators. For example, when evaluating A OR B, A is evaluated first. In the event it evaluates to false, B is evaluated, and the result determined. In the event A evaluates to true, the result is determined to be true and B is not evaluated. The time to evaluate B is saved. An expression for the expected time to evaluate (A OR B) is:

$$\text{time}(A \text{ OR } B) = \text{time}(A) + \text{probability}(A=0) \times \text{time}(B).$$

Correspondingly, an expression for the expected time to evaluate (B OR A) is:

$$\text{time}(B \text{ OR } A) = \text{time}(B) + \text{probability}(B=0) \times \text{time}(A).$$

When time(A) (e.g., the expected time to evaluate A), time(B) (e.g., the expected time to evaluate B), probability (A=0), and probability(B=0) are known, an efficient ordering of the query can be determined. A similar logic applies to the AND operator.

The system for determining a query ordering comprises a database system comprising a set of commingled data. The commingled data comprises data supplied by a plurality of tenants for the purpose of performing benchmarking computations. Queries are performed on the database system comprising a set of commingled data. In order to determine the estimated time to evaluate an operator and the probability it will evaluate to true, the database is analyzed. Estimates of the total time to evaluate the operator (e.g., based on the number of data instances that need to be evaluated to evaluate the operator and an estimated time to evaluate an instance), and an estimate of its probability of evaluating to true is determined. In some embodiments, the estimation of cost or time comes from looking at historical execution information of the given field across all tenants. So, for example, an estimate of the cost or time of executing a query on the field 'Worker is a Superstar' is based on prior queries on that field (including other tenant queries). The value returned from prior execution information can be translated into something more heuristic like 'CHEAP', 'EXPENSIVE', etc. The efficient query ordering can be determined after the estimated values are determined for both operators. In the event that the efficient ordering is different from the user-specified ordering, a user is prompted for permission to change the ordering to the efficient ordering. In the event that the permission is granted, the ordering is changed. In some embodiments, the ordering is changed to the efficient ordering automatically.

When an indication is received from the user to execute the query, the query is executed and results provided to the user. The query execution is additionally tracked so that actual evaluation data describing the evaluation time for the operator or operators that were evaluated can be used for future estimates. The system provides a more efficient system for computation using a more time efficient execution of queries.

In various embodiments, the knowledge learned from the co-mingled data warehouse is used to optimize all queries, non-benchmark queries, benchmark queries, or any other appropriate query. As an example for non-benchmark query:

Imagine a report is run on a large set of worker objects, and a filter is applied with two predicates in it:
Filter
P1: Is Superstar && P2: Is Female
Let's also say that it is known that predicate P1 is expensive to apply to each Worker object, and that P2 is very cheap. Let's say it is also known that P2 is true for roughly ½ of the worker objects in the set. Then it's better to re-order the filter so that P2 is applied to each instance before P1
This is exactly the type of optimization that can be made if those required bits of information are stored in the global warehouse.
Required Info:
  Cost of applying each field in the predicate
  Operator: OR vs AND
  Heuristic information that gives the likelihood of success or failure distribution FIG. 1 is a block diagram illustrating an embodiment of a network system. In some embodiments, the network system of FIG. 1 comprises a system for a multitenant based query plan. In the example shown, tenant system 108, tenant system 110, and tenant system 112 store data in separate areas of tenant data storage system 104. This separation ensures that a given tenant's data is secure. However, there are times when it is useful to have access to a pool of many tenants' data in exchange for providing access to the tenant's own data. Data that is part of the multitenant pool of data is stored either in tenant data storage system 104 in a commingling area or in multitenant database system 106. Multitenant database system 106 enables access to the multitenant pool of data as part of a service (e.g., a benchmarking service that enables comparison of tenant data with a larger pool of data from other tenants). A tenant can opt in to sharing data in exchange for access to the data pool and opting in enables multitenant database system 106 to access a copy of relevant data associated with the opt in plan and appropriately stripped of identification information. For example, when a request is received by multitenant database system 106 from a tenant system (e.g., tenant system 108, tenant system 110, or tenant system 112), the request is processed to determine whether the ordering of the requested processing is efficient. In the event that there is a more efficient ordering than the requested ordering, either the system automatically changes the ordering or a user is prompted as to whether a change to the ordering is acceptable. Administrator system 102 is able to provide administration functionality to different components of the system including multitenant database system 106.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, tenant data storage system 104, multitenant database system 106, and tenant system 108 communicate via network 100. Administrator system 102 comprises an administrator system for use by an administrator. Administrator system 102 comprises an administrator system for executing administrator commands, for configuring tenant data storage system 104 or multitenant database system 106, for querying tenant data storage system 104 or multitenant database system 106, etc. Tenant data storage system 104 comprises a storage system for storing tenant data (e.g., customer organization data). Tenant data storage system 104 comprises a plurality of tenant data storage units for storing tenant data isolated by tenant, and in some cases, a commingling storage unit for storing commingled tenant data. Multitenant database system 106 comprises a database system for providing tenant user access to data stored on either in a commingling storage unit of tenant data storage system 104 or in multitenant database system 106 (e.g., access to add data, view data, modify data, delete data, access reports, execute business processes, etc.). Tenant system 108 comprises a tenant system for use by a tenant user. A tenant user uses tenant system 108 to interact with multitenant database system 106, for example to store database data, to request database data, to request reporting based on database data, etc. In some embodiments, the network system of FIG. 1 comprises a plurality of tenant systems associated with one or more tenants.

Tenant data storage system 104 comprises a tenant data storage system for storing data in a database for a set of tenants. Tenant data storage system 104 comprises a set of distinct tenanted storage systems (for example—separate hard drives, separate virtual machines, etc.) for storing tenant data in such a way that tenants cannot access each other's data. Tenant data storage system 104 additionally comprises a secure data commingling system for managing data transfer from the tenanted storage systems to the commingling storage and for executing data analyses and reporting on the commingling storage unit. Multitenant database system 106 comprises a system for performing database actions (e.g., storing data, modifying data, querying data, performing reports, etc.) on tenant data stored in a commingling storage area of either tenant data storage system 104 or multitenant database system 106. A secure data commingling system includes interfaces for transmitting and receiving tenant data (e.g., from one or more tenant data storage units to a commingling storage area—for example, comprising a set of commingled data), and for receiving a query (e.g., for performing on the tenant data). The secure data commingling system additionally comprises a processor for determining an efficient ordering for the query, wherein the efficient ordering for the query is based at least in part on the set of commingled data, and in the event the efficient ordering for the query is different from a user indicated ordering for the query, prompt a user for a permission to change an execution ordering for the query.

Figure 3:
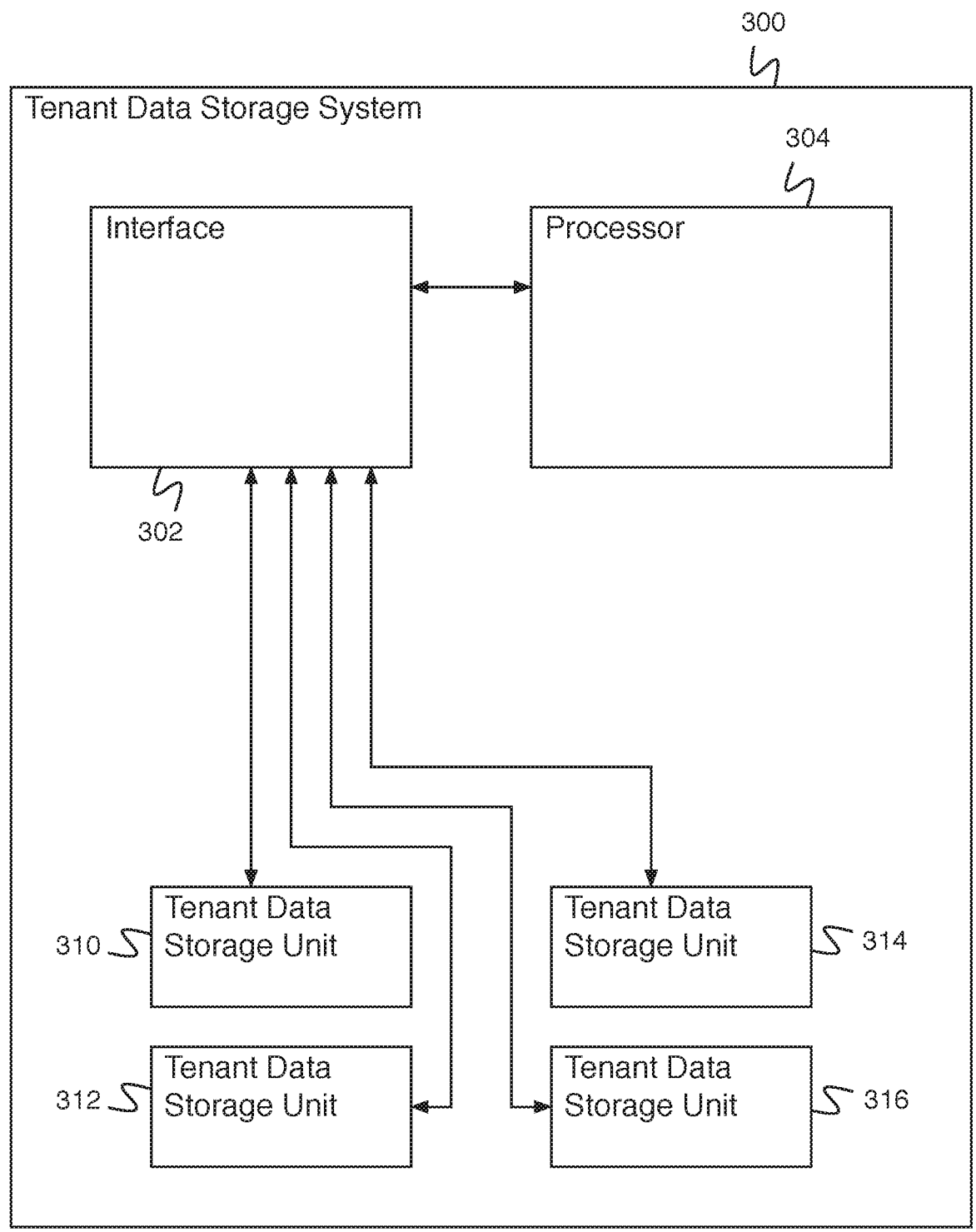
FIG. 3 is a block diagram illustrating an embodiment of a tenant data storage system.
Figure 4:
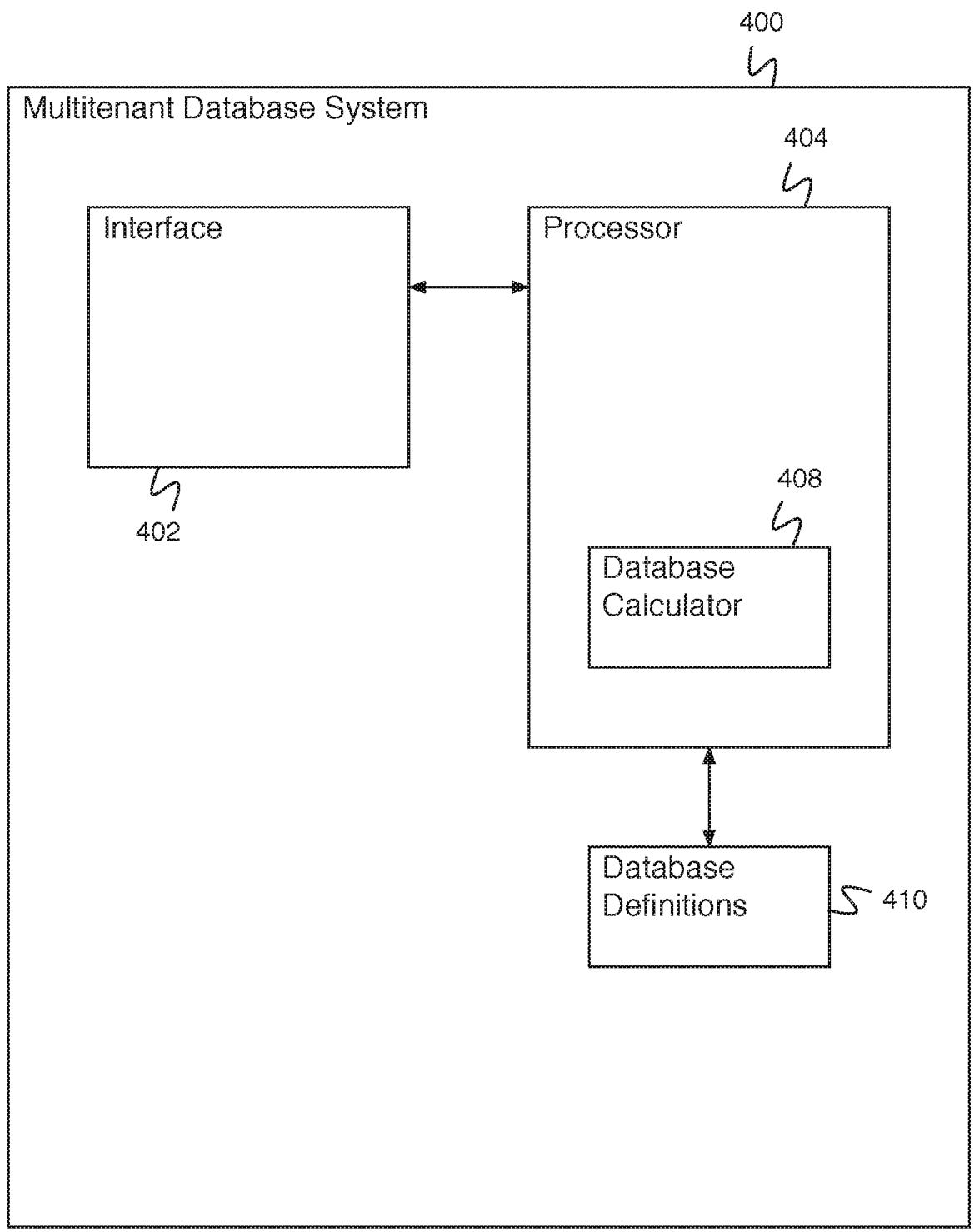
FIG. 4 is a block diagram illustrating an embodiment of a multitenant database system.
Figure 5:
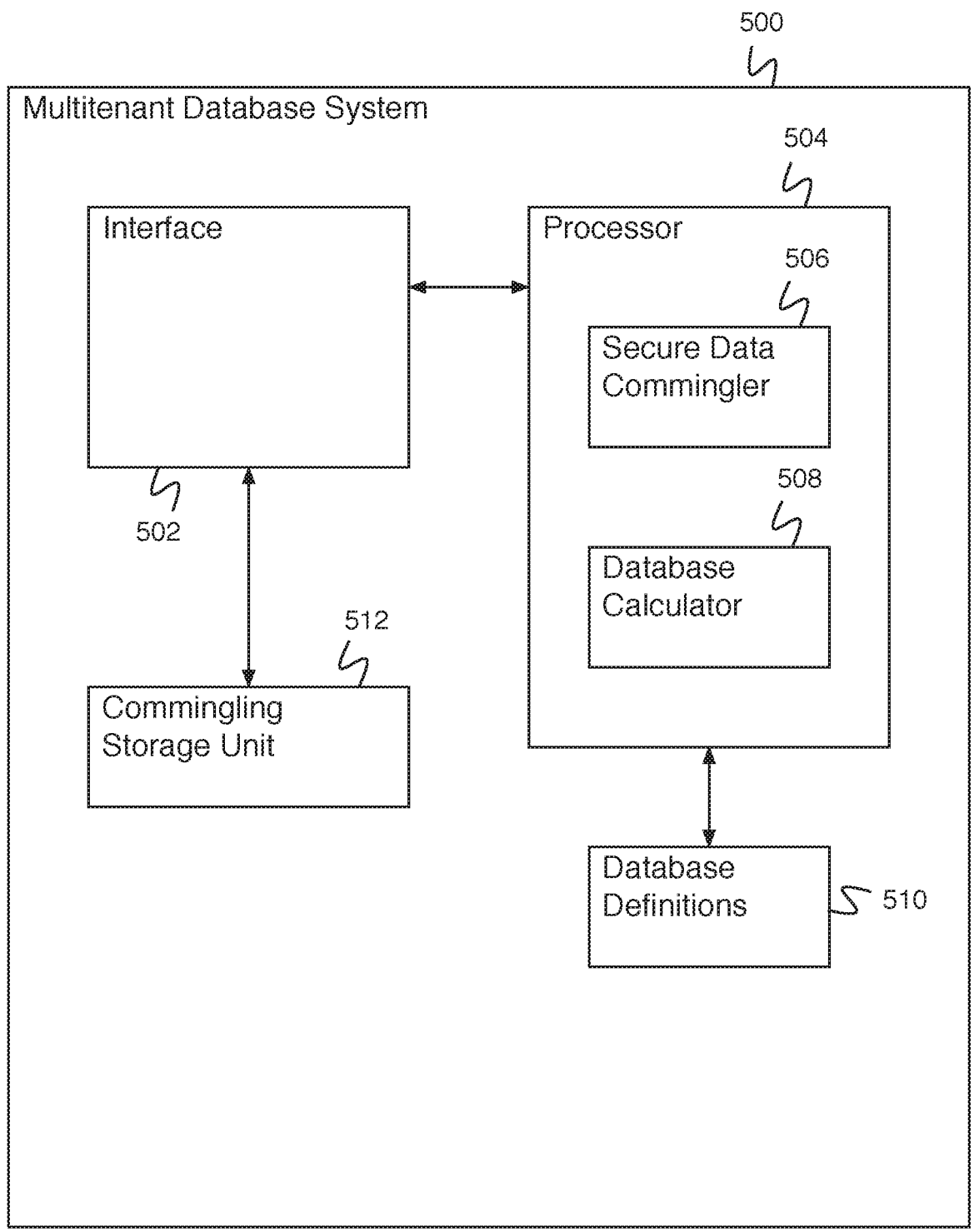
FIG. 5 is a block diagram illustrating an embodiment of a multitenant database system.

In the following FIGS. 2, 3, 4, and 5, variations of the location of the subsystems of the secure data commingler and the commingling storage unit are shown. Specifically, the location of the secure data commingler and the commingling storage unit is either in the tenant data storage unit (a combination of FIG. 2 and FIG. 5 are used as the implementations for the corresponding units in FIG. 1), the multitenant database system (a combination of FIG. 3 and FIG. 4 are used as the implementations for the corresponding units in FIG. 1), or both the tenant data storage unit and the multitenant database system (a combination of FIG. 2 and FIG. 4 are used as the implementations for the corresponding units in FIG. 1).

Figure 2:
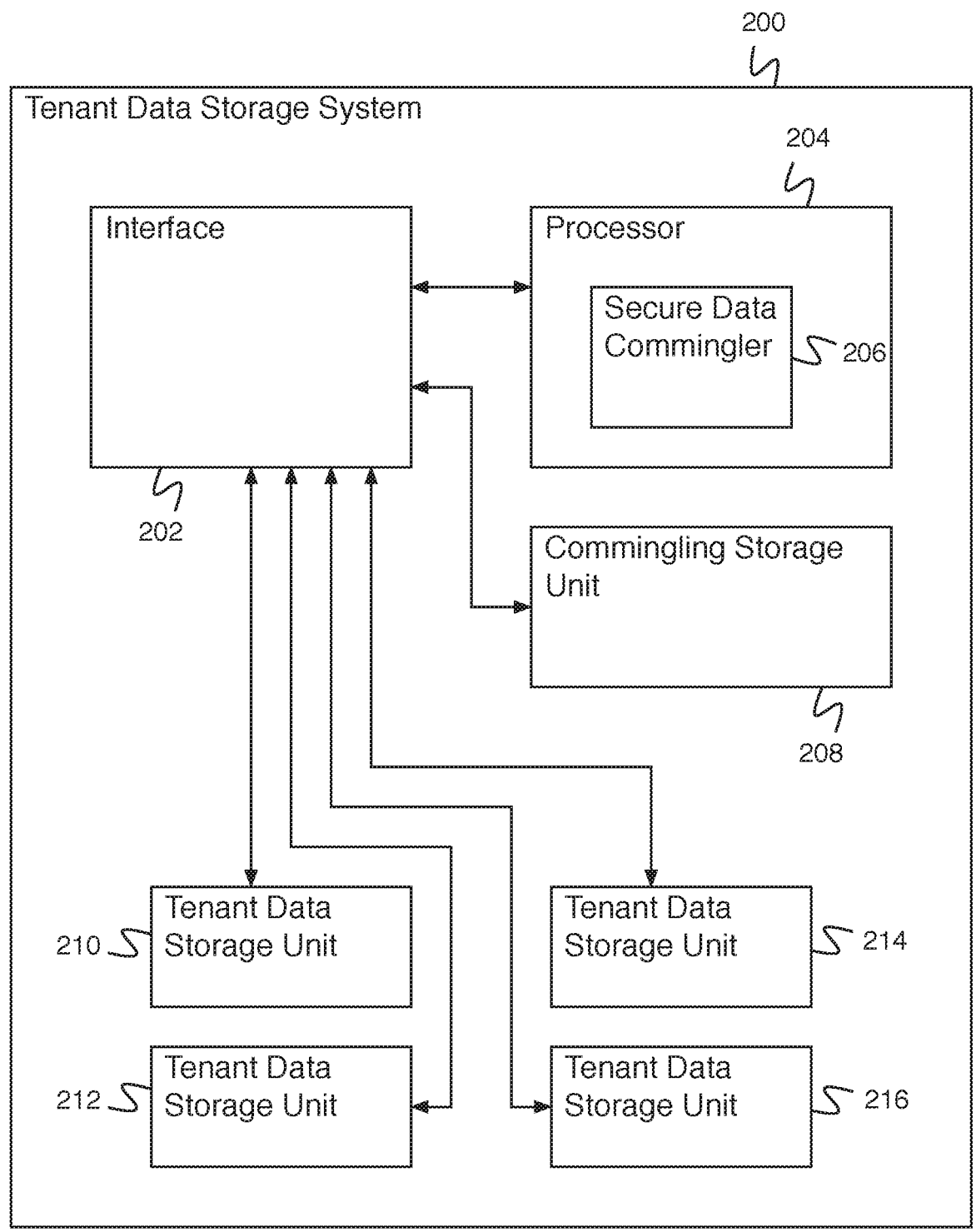
FIG. 2 is a block diagram illustrating an embodiment of a tenant data storage system.

FIG. 2 is a block diagram illustrating an embodiment of a tenant data storage system. In some embodiments, tenant data storage system 200 comprises tenant data storage system 104 of FIG. 1. In the example shown, tenant data storage system 200 is used to store tenant data in tenant data storage units (e.g., different tenants' data in separate storage areas in tenant data storage unit 210, tenant data storage unit 212, tenant data storage unit 214, and tenant data storage unit 216). Each tenant has associated with it a separate storage area—for example, a tenant data storage unit could be entirely associated with a different single tenant or the tenant data storage unit could have a plurality of areas each associated with a single tenant. The plurality of tenant data storage units serves to store data associated with different tenants. Tenant data storage system 200 comprises any appropriate number of tenant data storage units. In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

Tenant data storage system 200 additionally comprises commingling storage unit 208 for commingling a portion of tenant data. Tenant data storage system 200 additionally comprises secure data commingler 206. Tenant data storage system 200 comprises processor 204 and interface 202. Interface 202 comprises an interface for receiving requests to provide or store tenant data (e.g., to and from tenant data storage unit 210, from tenant data storage unit 212, from tenant data storage unit 214, or from tenant data storage unit 216) and for providing and receiving tenant data to be commingled in commingling storage unit 208.

Interface 202 additionally comprises an interface for receiving an indication to transfer data to commingling storage unit 208, receiving a request to perform a calculation based on data stored in commingling storage unit 208, etc.

Interface 202 additionally comprises an interface for receiving a set of commingled data (e.g., the commingled data stored on commingling storage unit 208) and for receiving a query. Processor 204 additionally determines an efficient ordering for the query, and in the event the efficient ordering for the query is different from a user indicated ordering for the query, prompts a user for permission to change an execution ordering for the query.

Each tenant data storage unit (e.g., tenant data storage unit 210, tenant data storage unit 212, tenant data storage unit 214, tenant data storage unit 216) comprises a calculation library associated with the tenant. Commingling storage unit 208 additionally comprises a calculation warehouse. The calculation warehouse additionally comprises an index for the plurality of available calculations. The calculation warehouse is searchable using the index. In some embodiments, authentication is required for a user to access a calculation from the calculation warehouse (e.g., only specific users or users associated with specific tenants are allowed to access the calculation, the calculation is password protected, a user is required to purchase the calculation or pay a license fee to gain authentication to use the calculation, etc.).

Secure data commingler 206 of processor 204 is configured to build an analytic database stored in commingling storage unit 208 using commingled data stored on commingling storage unit 208. Secure data commingler 206 is able to delete and/or rebuild the analytic database from the commingled data in response to an indication. Secure data commingler 206 of processor 204 determines one or more instances of data to be transferred and indicates to interface 202 to transfer tenant data to be stored in commingling storage unit 208.

In various embodiments, tenant data is transferred upon request (e.g., a tenant request, an administrator request, etc.) or tenant data is transferred automatically (e.g., according to a predetermined schedule, when specific conditions are met, etc.).

FIG. 3 is a block diagram illustrating an embodiment of a tenant data storage system. In some embodiments, tenant data storage system 300 comprises tenant data storage system 104 of FIG. 1. In the example shown, tenant data storage system 300 is used to store different tenants' data in separate storage areas in tenant data storage unit 310, tenant data storage unit 312, tenant data storage unit 314, and tenant data storage unit 316. A tenant has associated with a separate storage area—for example, each tenant data storage unit could be entirely associated with it a different single tenant. The plurality of tenant data storage units serves to store data associated with different tenants. Tenant data storage system 300 comprises any appropriate number of tenant data storage units. Tenant data storage system 300 additionally is able to transfer tenant stored data to a commingling storage unit (not shown in FIG. 3) for commingling a portion of tenant data.

Tenant data storage system 300 comprises processor 304 and interface 302. Interface 302 comprises an interface for receiving requests to provide or store tenant data (e.g., to and from tenant data storage unit 310, from tenant data storage unit 312, from tenant data storage unit 314, or from tenant data storage unit 316) and for providing and receiving tenant data to be commingled in a commingling storage unit.

Interface 302 additionally comprises an interface for receiving an indication to transfer data to the commingling storage unit, receiving a request to perform a calculation based on data stored in the commingling storage unit, receiving a request to create a calculation, receiving a request to access a calculation via a calculation warehouse, providing a calculation result, providing a report based on calculation results, etc. Processor 304 additionally comprises a processor for providing a calculation interface, for providing a calculation warehouse interface, for accessing a calculation stored in a calculation library, for executing a calculation on a commingled data set, for providing a calculation result, etc. Each tenant data storage unit (e.g., tenant data storage unit 310, tenant data storage unit 312, tenant data storage unit 314, tenant data storage unit 316) comprises a calculation library associated with the tenant associated with the tenant data storage unit.

Secure data commingler of another system is configured to build an analytic database stored in a commingling storage unit. The secure data commingler is able to delete and/or rebuild the analytic database in response to an indication. The secure data commingler determines one or more instances of data to be transferred and indicates to interface 302 to transfer tenant data to be stored in the commingling storage unit. Interface 302 additionally comprises an interface for receiving a set of commingled data (e.g., the commingled data stored on the commingling storage unit) and for receiving a query. Processor 304 additionally determines an efficient ordering for the query, and in the event the efficient ordering for the query is different from a user indicated ordering for the query, prompts a user for permission to change an execution ordering for the query.

In various embodiments, tenant data is transferred upon request (e.g., a tenant request, an administrator request, etc.) or tenant data is transferred automatically (e.g., according to a predetermined schedule, when specific conditions are met, etc.). In various embodiments, the plurality of tenant data storage units comprise tenant data storage units associated with separate computers, tenant data storage units associated with separate hard drives, tenant data storage units associated with separate virtual machines, tenant data storage units associated with separate storage partitions, or tenant data storage units separated in any other appropriate way.

FIG. 4 is a block diagram illustrating an embodiment of a multitenant database system. In some embodiments, multitenant database system 400 is used to implement multitenant database system 106 of FIG. 1 with the tenant data storage system of FIG. 2. In the example shown, multitenant database system 400 receives a request, via interface 402, from a user for a service that uses multitenanted data. Database calculator 408 of processor 404 using database definitions 410 determines a report using data stored in a commingling storage unit and provides the report to the user. The data in commingling storage unit is acquired using a secure data commingler from a number of tenant data storage units. A tenant can opt into sharing data for use by a service (e.g., a benchmarking service) and the data is transferred to a commingling storage unit. The data is transferred in some cases automatically when the data is updated so that the data stored in the commingling storage unit is always up to date.

FIG. 5 is a block diagram illustrating an embodiment of a multitenant database system. In some embodiments, multitenant database system 500 is used to implement multitenant database system 106 of FIG. 1 with the tenant data storage system of FIG. 3. In the example shown, multitenant database system 500 receives a request, via interface 502, from a user for a service that uses multitenanted data. Database calculator 508 of processor 504 using database definitions 510 determines a report using data stored in a commingling storage unit (e.g., commingling storage unit 512) and provides the report to the user. The data in commingling storage unit 512 is acquired using secure data commingler 506 from a number of tenant data storage units. A tenant can opt into sharing data for use by a service (e.g., a benchmarking service) and the data is transferred to a commingling storage unit (e.g., commingling storage unit 512). The data is transferred in some cases automatically when the data is updated so that the data stored in the commingling storage unit is always up to date.

In some embodiments, the commingling storage unit and the secure data commingler is split between two systems and in that case multitenant database system 500 of FIG. 5 can be used in conjunction with tenant data storage system of FIG. 2. In some cases, each of the two commingling storage units are operated by the associated collocated secure data commingler. Data for a report is separately retrieved from each commingling storage unit.

Figure 6:
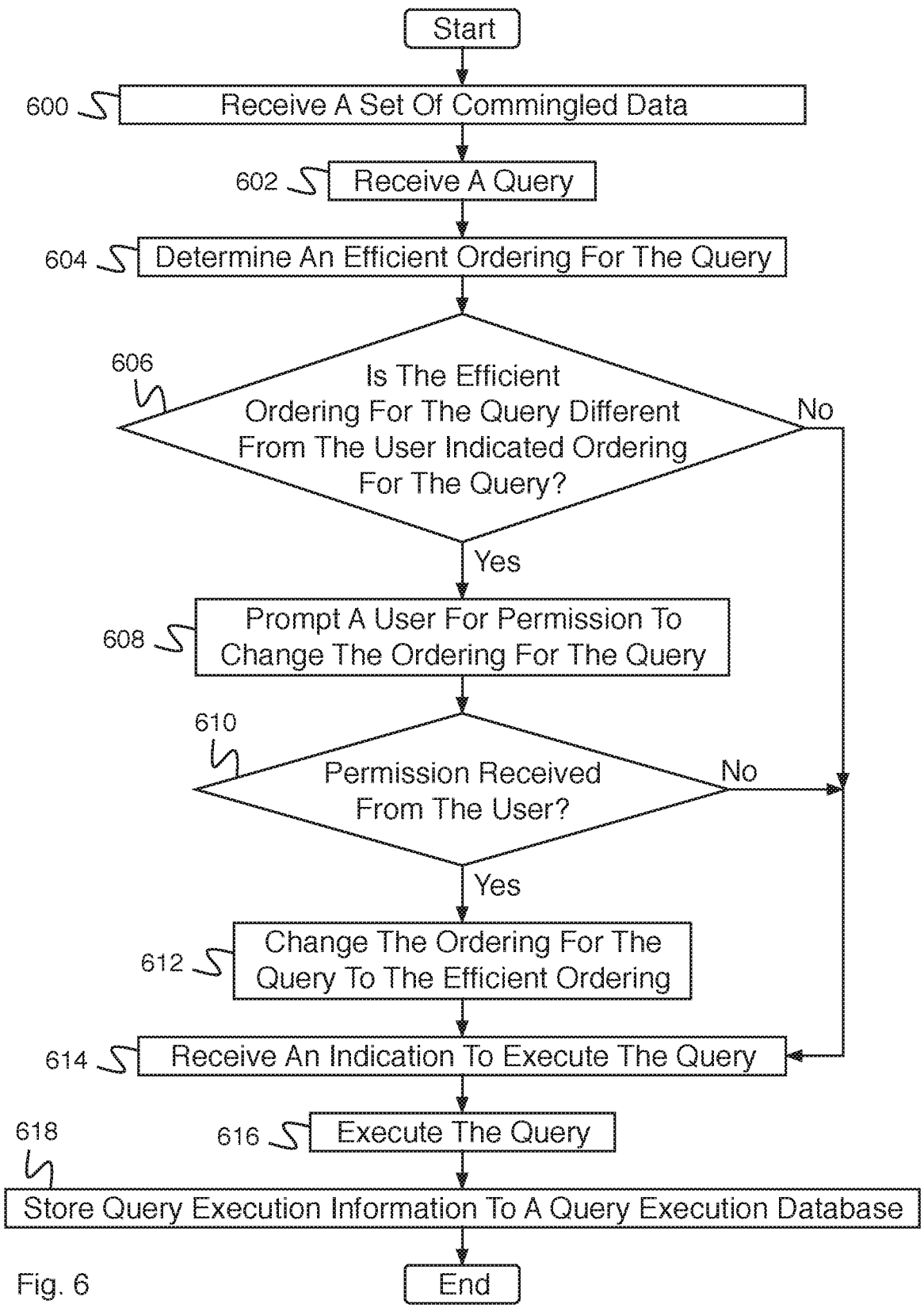
FIG. 6 is a flow diagram illustrating an embodiment of a process for a multitenant based query plan.

FIG. 6 is a flow diagram illustrating an embodiment of a process for a multitenant based query plan. In some embodiments, the process of FIG. 6 is executed by tenant data storage system 104 of FIG. 1. In the example shown, in 600, a set of commingled data is received. The set of commingled data comprises data associated with a plurality of tenants, for example, data stored by commingling storage unit 208 of FIG. 2. In 602, a query is received. In 604, an efficient ordering for the query is determined. The efficient ordering for the query is based at least in part on the set of commingled data. In 606, it is determined whether the efficient ordering for the query is different from the user indicated ordering from the query. In response to it being determined that the efficient ordering for the query is not different from the user indicated ordering for the query, control passes to 614. In response to it being determined that the efficient ordering for the query is different from the user indicated ordering for the query, control passes to 608. In 608, the user is prompted for permission to change the ordering for the query. In 610, it is determined whether the permission is received from the user. In response to it being determined that permission is not received from the user, control passes to 614. In response to it being determined that permission is received from the user, control passes to 612. In 612, the ordering for the query is changed to the efficient ordering. In 614, an indication to execute the query is received. In 616, the query is executed. In 618, query execution information is stored to a query execution database. In some embodiments, the efficient ordering for the query is determined (e.g., in 604) based at least in part on information stored to the query execution database.

In some embodiments, the efficient ordering for the query is automatically adopted for execution so that steps 606, 608, and 610 are omitted.

Figure 7:
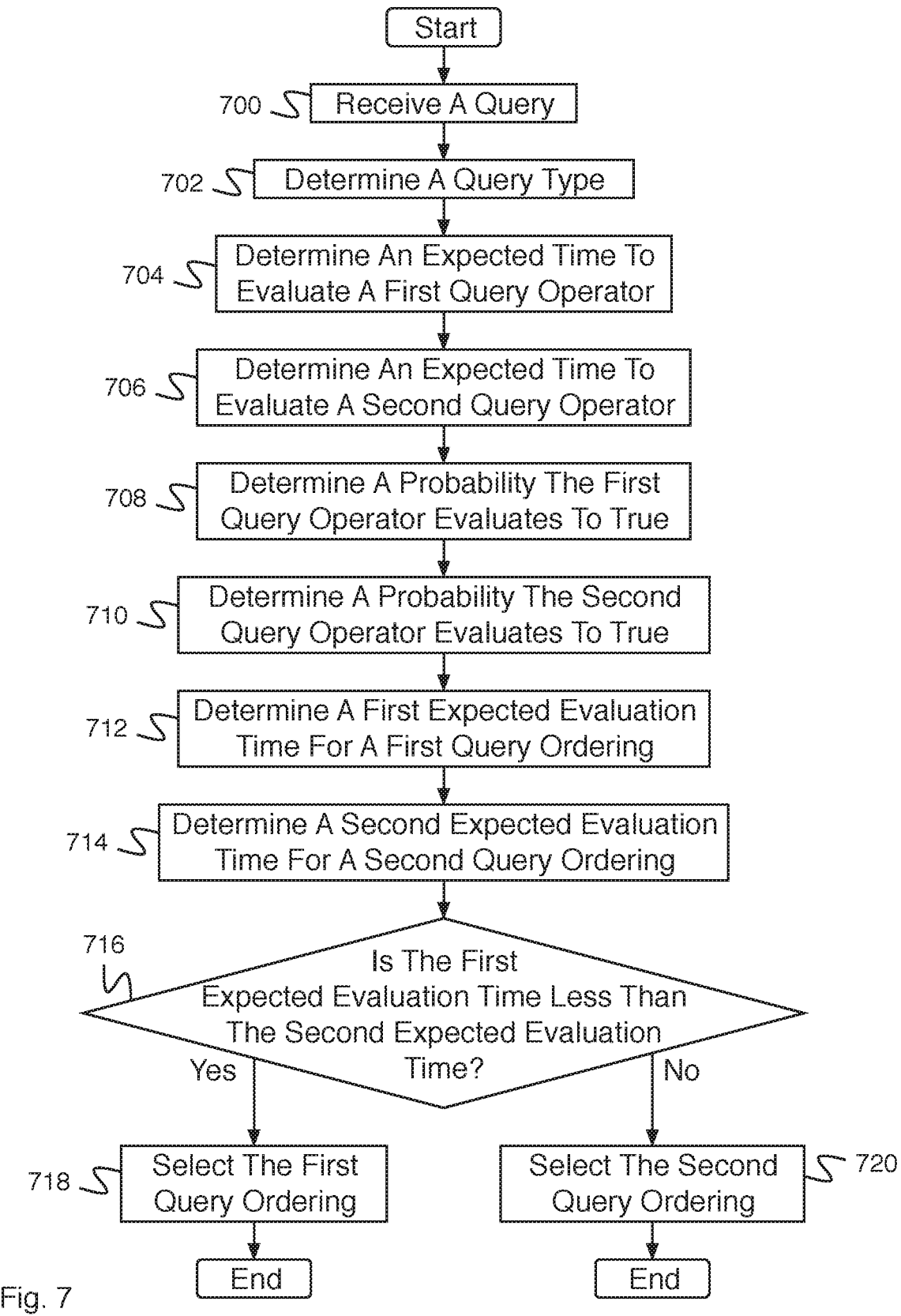
FIG. 7 is a flow diagram illustrating an embodiment of a process for determining an efficient ordering for a query.

FIG. 7 is a flow diagram illustrating an embodiment of a process for determining an efficient ordering for a query. In some embodiments, the process of FIG. 7 implements 604 of FIG. 6. In the example shown, in 700, a query is received. In 702, a query type is determined. For example, a query type comprises a query including an AND operator or a query including an OR operator. In 704, an expected time to evaluate a first operator is determined. In 706, an expected time to evaluate a second query operator is determined. In 708, a probability the first query operator evaluates to true is determined. In 710, a probability the second operator evaluates to true is determined. The probability the first query operator evaluates to true or the second query operator evaluates to true comprises a query element evaluation bias. For example, a bias indicating that the operator is more likely to evaluate true, or a bias indicating that the operator evaluates true or false with even probability (e.g., no bias). In 712, a first expected evaluation time for a first query ordering is determined. For example, the first query ordering comprises a first choice of two possible query orderings, e.g., A OR B. In 714, a second expected evaluation time for a second query ordering is determined. For example, the second query ordering comprises a second choice of two possible query orderings, e.g., B OR A. In 716, it is determined whether the first expected evaluation time is less than the second expected evaluation time. In response to it being determined that the first expected evaluation time is less than the second expected evaluation time, control passes to 718. In 718, the first query ordering is selected, and the process ends. In response to it being determined in 716 that the first expected evaluation time is not less than the second expected evaluation time, control passes to 720. In 720, the second query ordering is selected, and the process ends.

Figure 8:
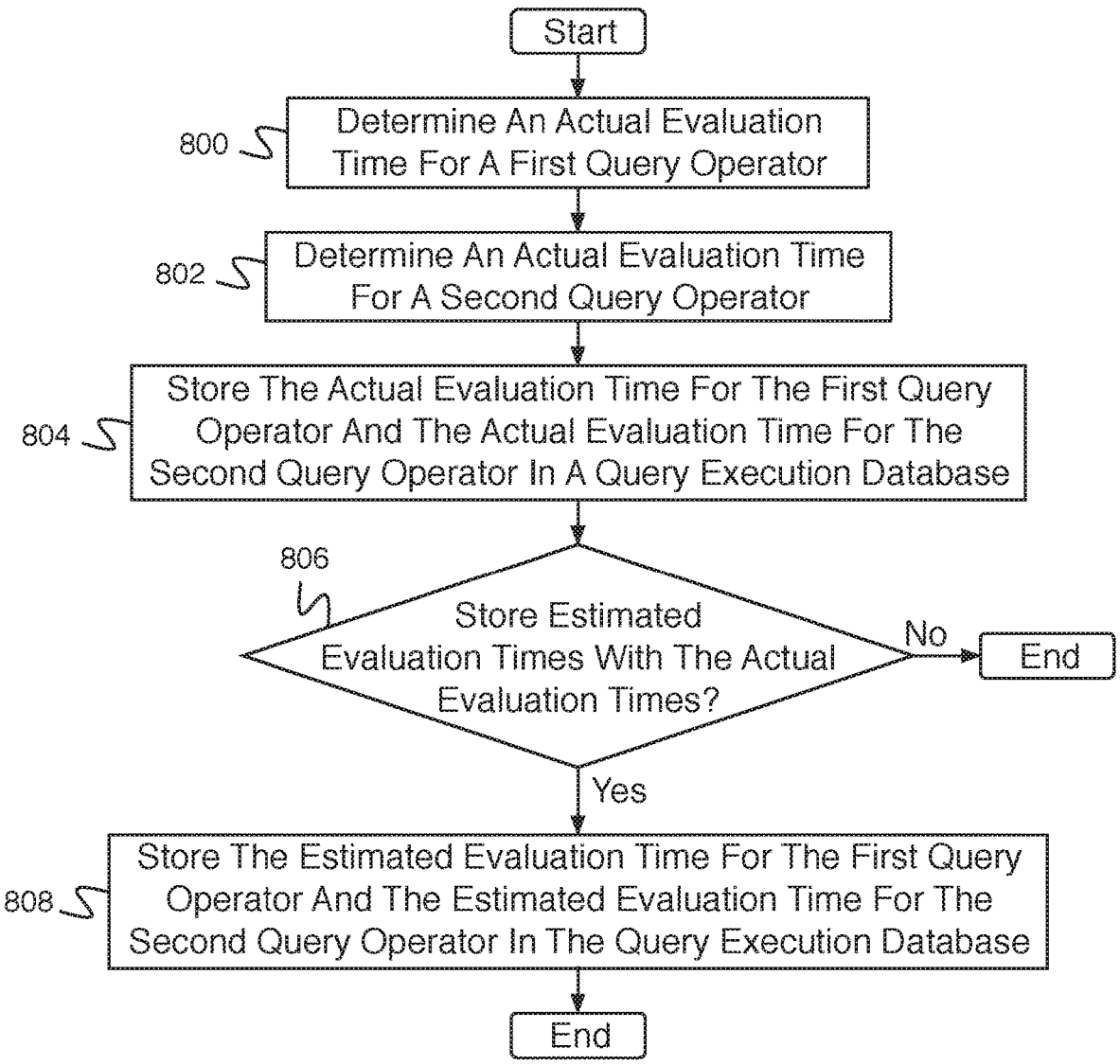
FIG. 8 is a flow diagram illustrating an embodiment of a process for storing query execution information to a query execution database.

FIG. 8 is a flow diagram illustrating an embodiment of a process for storing query execution information to a query execution database. In some embodiments, the process of FIG. 8 implements 618 of FIG. 6. In the example shown, in 800, an actual evaluation time for a first query operator is determined. In 802, an actual evaluation time for a second query operator is determined. In 804, the actual evaluation time for the first query operator and the actual evaluation time for the second query operator are stored in a query execution database. In 806, it is determined whether to store estimated evaluation times with the actual evaluation times. For example, estimated evaluation times are stored with the actual evaluation times in order to preserve a record of the evaluation accuracy. In response to it being determined not to store estimated evaluation times with the actual evaluation times, the process ends. In response to it being determined to store estimated evaluation times with the actual evaluation times, control passes to 808. In 808, the estimated evaluation time for the first query operator and the estimated evaluation time for the second query operator are stored in the query execution database.

Figure 9:
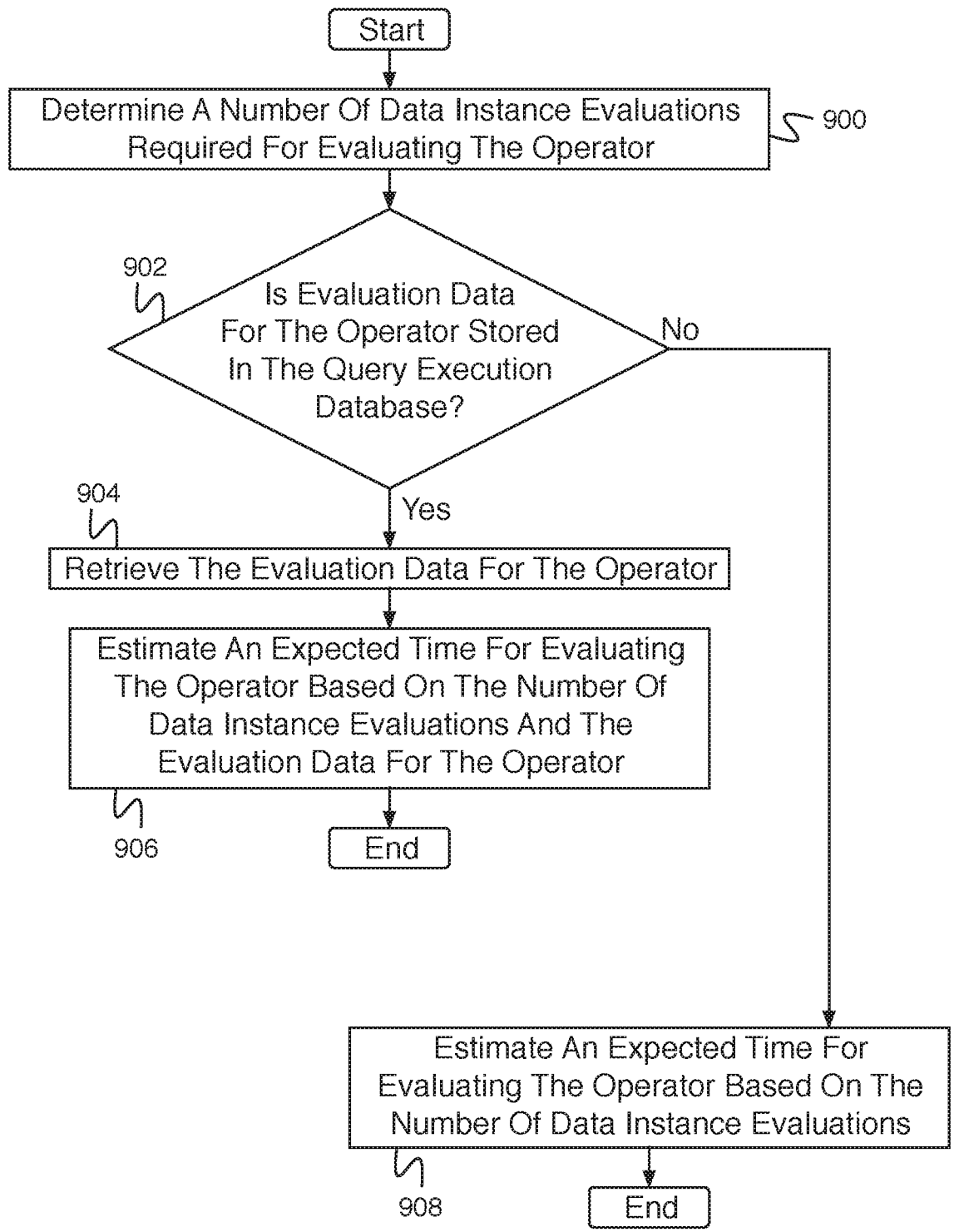
FIG. 9 is a flow diagram illustrating an embodiment of a process for determining an expected time to evaluate a query operator.

FIG. 9 is a flow diagram illustrating an embodiment of a process for determining an expected time to evaluate a query operator. In some embodiments, the process of FIG. 9 implements 704 or 706 of FIG. 7. In the example shown, in 900, a number of data instance evaluations required for evaluating the operator is determined. For example, a number of data instances related to the operator stored in a commingling storage unit is determined. In 902, it is determined whether evaluation data for the operator is stored in the query execution database. In response to it being determined that evaluation data for the operator is not stored in the query execution database, control passes to 908. In 908, a time for evaluating the operator is estimated based on the number of data instance evaluations. For example, the number of data instance evaluations is multiplied by an estimated time to evaluate one data instance. The process then ends. In response to it being determined in 902 that evaluation data for the operator is stored in the query execution database, control passes to 904. In 904, evaluation data for the operator is retrieved. In 906, a time for evaluating the operator is estimated based on the number of data instance evaluations and the evaluation data for the operator. For example, in the event that evaluation data comprises both actual evaluation times and estimated evaluation times, the expected time for evaluating the operator can be determined by estimating an expected time for evaluating the operator based on the number of data instance evaluations, and scaling that estimate using a previous estimate accuracy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a query ordering, comprising:
a processor; and
a memory coupled with the processor, wherein the memory is configured to provide the processor with instructions which when executed cause the processor to:
receive a set of commingled data, wherein the commingled data comprises data supplied by a plurality of tenants for the performing benchmarking computations;
receive a query from a user associated with a tenant of the plurality of tenants;
determine an efficient ordering for the query, wherein the efficient ordering for the query is based at least in part on the set of commingled data;
determine whether the efficient ordering for the query matches a user indicated ordering for the query; and
in response to determining that the efficient ordering for the query does not match the user indicated ordering for the query, prompt the user for a permission to change an execution ordering for the query.

2. The system of claim 1, wherein the efficient ordering is determined based at least in part on an expected time to evaluate a query operator.

3. The system of claim 2, wherein the expected time to evaluate a query operator is determined based at least in part on the set of commingled data.

4. The system of claim 3, wherein determining the expected time to evaluate a query operator comprises determining a number of data instance evaluations required for evaluating the operator.

5. The system of claim 4, wherein determining the expected time to evaluate a query operator comprises multiplying a number of data instance evaluations required for evaluating the operator by an estimated time to evaluate a data instance.

6. The system of claim 1, wherein the efficient ordering is determined based at least in part on a query element evaluation bias.

7. The system of claim 6, wherein the query element evaluation bias is determined based at least in part on the set of commingled data.

8. The system of claim 1, wherein the efficient ordering is determined based at least in part on a query operator.

9. The system of claim 1, wherein the processor is further configured to receive the permission to change the execution ordering for the query.

10. The system of claim 9, wherein the processor is further configured to change the execution ordering for the query to the efficient ordering.

11. The system of claim 1, wherein the processor is further configured to receive an indication to execute the query.

12. The system of claim 1, wherein the processor is further configured to execute the query.

13. The system of claim 12, wherein the processor is further configured to store query execution information in a query execution information database.

14. The system of claim 13, wherein query execution information comprises a time to evaluate a query operator.

15. The system of claim 13, wherein query execution information comprises an element evaluation result.

16. The system of claim 13, wherein query execution information comprises an estimated time to evaluate a query operator.

17. The system of claim 13, wherein a query element evaluation time is determined based at least in part on data in the query execution information database.

18. The system of claim 17, wherein determining the estimated time to evaluate a query operator comprises scaling an expected time for evaluating the query operator based on the number of data instance evaluations using a previous estimate accuracy.

19. The system of claim 1, wherein determine an efficient ordering for the query comprises to select a first choice or a second choice of two possible logically equivalent query orderings.

20. A method for determining a query ordering, comprising:

receiving a set of commingled data, wherein the commingled data comprises data supplied by a plurality of tenants for performing benchmarking computations;

receiving a query from a user associated with a tenant of the plurality of tenants;

determining, using a processor, an efficient ordering for the query, wherein the efficient ordering for the query is based at least in part on the set of commingled data;

determining whether the efficient ordering for the query matches a user indicated ordering for the query; and in response to determining that the efficient ordering for the query does not match the user indicated ordering for the query, prompting the user for a permission to change an execution ordering for the query.

21. A computer program product for determining a query ordering, the computer program product being embodied in a tangible computer readable storage medium and comprising computer instructions for:

receiving a set of commingled data, wherein the commingled data comprises data supplied by a plurality of tenants for performing benchmarking computations;

receiving a query from a user associated with a tenant of the plurality of tenants;

determining an efficient ordering for the query, wherein the efficient ordering for the query is based at least in part on the set of commingled data;

determining whether the efficient ordering for the query matches a user indicated ordering for the query; and in response to determining that the efficient ordering for the query does not match the user indicated ordering for the query, prompting the user for a permission to change an execution ordering for the query.

* * * * *